May 12, 1970  S. W. GUTHRIE  3,511,292
TIRE TRACTION DEVICE
Filed Jan. 31, 1968
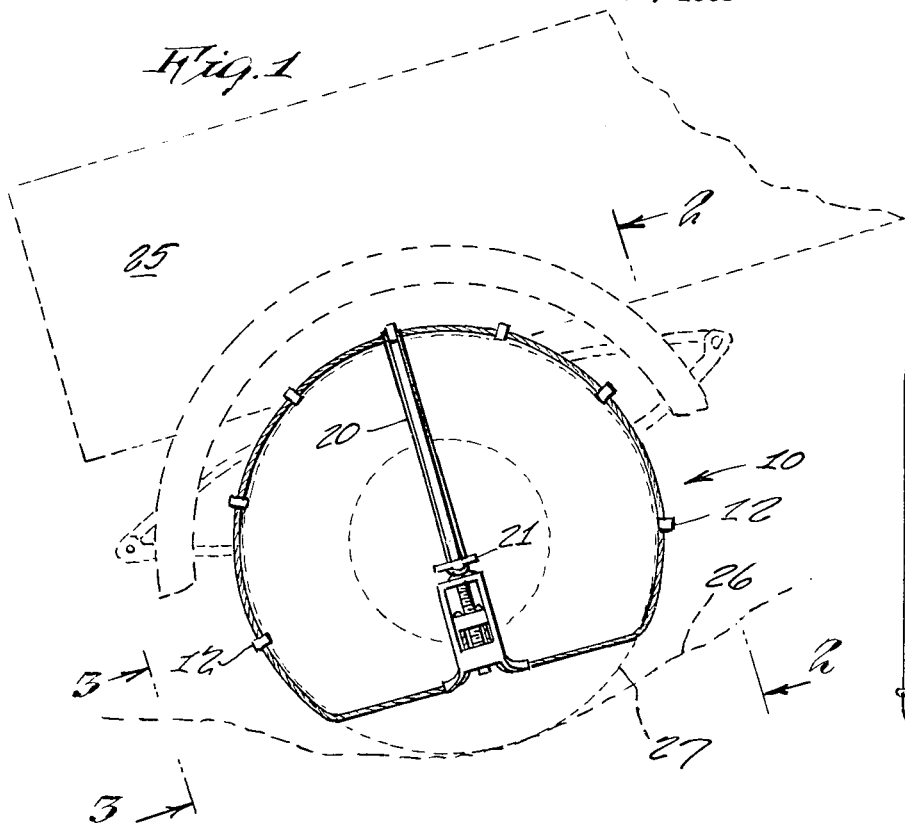
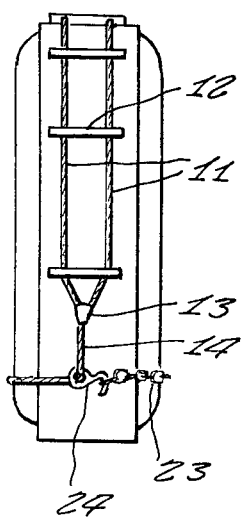
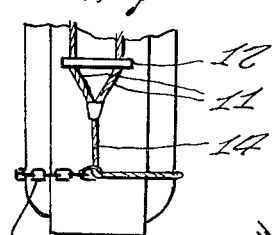
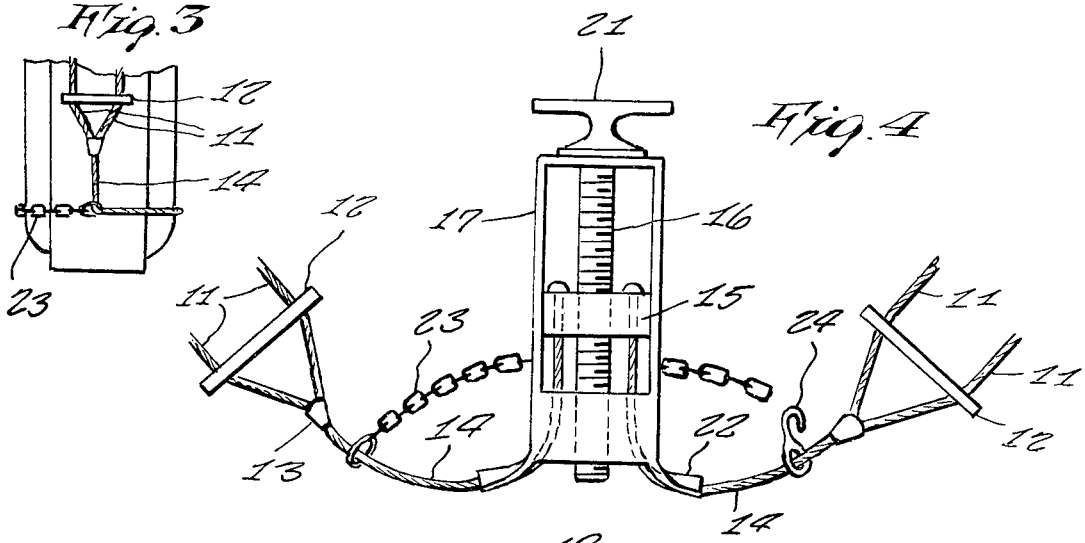
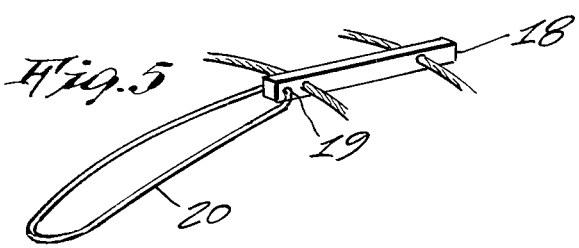
INVENTOR
SHELDON W. GUTHRIE

United States Patent Office 3,511,292
Patented May 12, 1970

3,511,292
TIRE TRACTION DEVICE
Sheldon W. Guthrie, 2109 Dartmouth St.,
Terrytown, La. 71285
Filed Jan. 31, 1968, Ser. No. 702,093
Int. Cl. B60c 27/10, 27/20
U.S. Cl. 152—225
3 Claims

ABSTRACT OF THE DISCLOSURE

An automobile tire traction device for getting a stuck vehicle out of a ditch, the device comprising a unit that can be slipped over the tire without need of jacking up the car, and including a take up harness carrying cleats, that can be tightened so firmly around an automobile tire that it is not necessary for the cleats to hang over the outer side or the inner side of the tire.

---

This invention relates generally to automotive wheel traction devices for use in the Southern states where tire traction aids are not standard equipment.

The principal object of the present invention is to provide a tire traction device for the purpose of aiding an automotive vehicle that is stuck in mud or in a ditch.

Another object of the present invention is to provide a tire traction device which can be readily secured around a tire without the necessity of jacking up the vehicle.

Yet another object of the present invention is to provide a tire traction device which accordingly is for emergency purposes only and is accordingly not recommended for continuous use.

Other objects of the present invention are to provide a tire traction device which is simple in design, inexpensive to manufacture, rugged in construction, easy to use and efficient in operation.

These and other objects will be readily evident upon a study of the following specification and the accompanying drawing wherein:

FIG. 1 is a side elevation view of the present invention shown as secured upon a wheel of a vehicle stuck in a ditch, FIG. 2 is an end elevation view thereof, FIG. 3 is a fragmentary opposite end elevation view, FIG. 4 is an enlarged elevation view of a portion of the device, and FIG. 5 is a detailed perspective view of one of the cleats and associated parts.

Referring now to the drawing in detail, reference numeral 10 represents a tire traction device according to the present invention wherein there are a pair of wire cables 11 maintained in parallel spaced apart relation by means of a plurality of equally spaced apart cleats 12 mounted therebetween, the opposite end of the cables 11 being spliced or otherwise secured at junction 13 to one end of each of a pair of cables 14, the opposite ends of the cable 14 being rigidly secured to nut 15 slideable along a threaded bolt 16 carried within a frame 17.

An intermediate one 18 of the cleats is provided with an opening 19 near one end thereof, the opening 19 receiving an endless band 20 made either of flexible rubber or comprising a tension coil spring, the band 20 in operative use being receivable around a handle 21 formed upon the head of the bolt 16.

A pair of oppositely extending flanges 22 each provide an arcuate surface around which the cables 14 are guided. One end of a chain 23 is secured to one of the cables 14, the opposite cable 14 carrying a hook 24 for the purpose of selectively engaging one of the links of the chain 23, as is shown in FIG. 2 of the drawing.

In operative use, when a vehicle 25 becomes stuck in a ditch 26 or otherwise becomes incapable of moving ahead due to lack of traction upon the tire 27, the present device may be easily and quickly attached over the tire 27 without requiring the necessity of jacking up the vehicle, such as is necessary with the use of conventional tire chains. In the present case, the device is simply fitted over the tire, as shown in FIG. 1 of the drawing with the cables 14 being located adjacent to the outer side of the tire 27, while the chain 23 is passed around the rear side of the tire and is then secured to the hook 24, as is shown in FIGS. 2 and 3 of the drawing. It will thus be evident that the cleats will now be positioned around the periphery of the tire where they will provide traction when the wheel is rotated. The bolt 16 is turned so to cause the nut 15 to be taken up and thus provide tension upon the parallel cables 11, and thus rigidly securing the cleats in a fixed position on the tire. The rubber or tension coil spring band 20 is then hooked over the handle 21, as shown in FIG. 1, and the device is ready for use. By attempting to move the vehicle rearwardly or forwardly, the tire will rotate sufficiently until the cleats become engaged with the ground 26 thus providing traction to prevent further spinning of the tire and allow the vehicle to move out of the ditch or mud. It is to be understood that the present invention is for emergency use only and is not for a continuous use such as conventional tire chains.

While various changes may be made in the detailed construction, it is understood that such changes will be within the spirit and scope of the present invention as is defined by the appended claims.

I claim:

1. In a tire traction device, the combination of a pair of flexible wire cables carrying a plurality of cleats rigidly secured thereupon, said cables being in parallel spaced apart relationship so as to be fitted around the periphery of an automotive vehicle tire, and self-contained means whereby said pair of cables may be secured upon said tire without the necessity of being passed beneath said tire, wherein said means comprises the ends of said cables being enjoined at their opposite ends to one end of each of a pair of second cables, the opposite ends of said second cables being secured to a nut threadingly engaged upon a threaded bolt carried within a frame, and said frame having a pair of oppositely extending flanges having arcuate faces around which said second cable is guided.

2. The combination as set forth in claim 1 wherein a chain is secured at its one end to one of said second cables, a hook is secured to the other of said second cables, the opposite end of said chain being selectively attachable to said hook, so to secure said device around a rear side of said tire.

3. The combination as set forth in claim 2, wherein an intermediate of said cleats is provided with an opening near one end thereof, an endless band inserted through said opening, said band being made of resilient or spring-like material, said bolt having a head, having a pair of oppositely extending arms defining a handle, and said band in operative use being fitted around said handle.

References Cited

UNITED STATES PATENTS

| | | | |
|---|---|---|---|
| 1,878,841 | 9/1932 | Gause | 152—213 |
| 2,429,738 | 10/1947 | Zimmer | 152—225 |
| 2,510,451 | 6/1950 | Williams et al. | 152—225 |
| 2,931,413 | 4/1960 | Randall | 152—225 XR |

ARTHUR L. LA POINT, Primary Examiner